(12) United States Patent  
Morris et al.

(10) Patent No.: US 8,358,049 B2
(45) Date of Patent: Jan. 22, 2013

(54) ENERGY CONVERTERS AND ASSOCIATED METHODS

(75) Inventors: Dylan J. Morris, Seneca, SC (US);
David F. Bahr, Pullman, WA (US);
Michael J. Anderson, Troy, ID (US);
John M. Youngsman, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 13/030,667

(22) Filed: Feb. 18, 2011

(65) Prior Publication Data

US 2011/0156533 A1  Jun. 30, 2011

Related U.S. Application Data

(63) Continuation of application No. 12/362,125, filed on Jan. 29, 2009, now Pat. No. 7,893,599.

(60) Provisional application No. 61/024,496, filed on Jan. 29, 2008.

(51) Int. Cl.
*H01L 41/08* (2006.01)

(52) U.S. Cl. .......... 310/329; 310/339; 310/800

(58) Field of Classification Search .......... 310/328, 310/329, 800
See application file for complete search history.

(56) References Cited

U.S. PATENT DOCUMENTS

| 4,051,395 | A | | 9/1977 | Taylor | |
|---|---|---|---|---|---|
| 4,315,433 | A | * | 2/1982 | Edelman et al. | 73/514.34 |
| 4,413,202 | A | * | 11/1983 | Krempl et al. | 310/338 |
| 4,558,249 | A | * | 12/1985 | Lerch et al. | 310/322 |
| 5,142,510 | A | * | 8/1992 | Rodda | 367/163 |
| 5,814,921 | A | | 9/1998 | Carroll | |
| 6,847,155 | B2 | * | 1/2005 | Schwartz et al. | 310/328 |
| 2007/0145861 | A1 | | 6/2007 | Tanner | |
| 2008/0238260 | A1 | | 10/2008 | Xu et al. | |
| 2009/0184606 | A1 | * | 7/2009 | Rosenthal et al. | 310/367 |

OTHER PUBLICATIONS

Amirtharajah, R. and A.P. Chandrakasan, Self-powered signal processing using vibration-based power generation. IEEE Journal of Solid-State Circuits, 1998. 33(5): pp. 687-695.

Anton, S.R. and H.A. Sodano, A review of power harvesting using piezoelectric materials (2003-2006). Smart Materials and Structures, 2007. 16(3): pp. R1-R21.

Aronov, B., On the optimization of the effective electromechanical coupling coefficients of a piezoelectric body. Journal of the Acoustical Society of America, 2003. 114(2): pp. 792-800.

Beeby, S.P., et al., A micro electromagnetic generator for vibration energy harvesting. Journal of Micromechanics and Microengineering, 2007(7): pp. 1257-1265.

Beeby, S.P., M.J. Tudor, and N.M. White, Energy harvesting vibration sources for microsystems applications. Measurement Science and Technology, 2006. 17(12): pp. R175-R195.

Casciati, F. and R. Rossi, A power harvester for wireless sensing applications. Structural Control & Health Monitoring, 2007. 14(4): pp. 649-659.

Crabtree, O.I., et al., Nonlinear vibrations of a pre-stressed laminated thin plate. International Journal of Mechanical Sciences, 2006. 48(4): pp. 451-459.

(Continued)

*Primary Examiner* — Mark Budd
(74) *Attorney, Agent, or Firm* — Perkins Coie LLP

(57) ABSTRACT

Energy converters and associated methods are disclosed herein. In one embodiment, an energy converter includes a first structural member spaced apart from a second structure member, a first piezoelectric element and a second piezoelectric element individually coupled to the first structural member and the second structural member, and a deflection member tensionally suspended between the first and second piezoelectric elements. The deflection member is substantially rigid.

22 Claims, 11 Drawing Sheets

OTHER PUBLICATIONS

Jenkins, C.H.M. and U.A. Korde, Membrane vibration experiments: An historical review and recent results. Journal of Sound and Vibration, 2006. 295(3-5): pp. 602-613.

Kim, H.W., et al., Piezoelectric energy harvesting under high prestressed cyclic vibrations. Journal of Electroceramics, 2005. 15(1): pp. 27-34.

Komaragiri, U., M.R. Begley, and J.G. Simmonds, The mechanical response of freestanding circular elastic films under point and pressure loads. Journal of Applied Mechanics, Transactions ASME, 2005. 72(2): pp. 203-212.

Lefeuvre, E., et al., A comparison between several vibration-powered piezoelectric generators for standalone systems. Sensors and Actuators, A: Physical, 2006. 126(2): pp. 405-416.

Lefeuvre, E., et al., Buck-boost converter for sensorless power optimization of piezoelectric energy harvester. IEEE Transactions on Power Electronics, 2007. 22(5): pp. 2018-2025.

Legtenberg, R., A.W. Groeneveld, and M. Elwenspoek, Comb-drive actuators for large displacements. Journal of Micromechanics and Microengineering, 1996. 6(3): pp. 320-329.

Leland, E.S. and P.K. Wright, Resonance tuning of piezoelectric vibration energy scavenging generators using compressive axial preload. Smart Materials and Structures, 2006(5): pp. 1413-1420.

Mossi, K., et al., Harvesting energy using a thin unimorph prestressed bender: Geometrical effects. Journal of Intelligent Material Systems and Structures, 2005. 16(3): pp. 249-261.

Ottman, G.K., et al., Adaptive piezoelectric energy harvesting circuit for wireless remote power supply. IEEE Transactions on Power Electronics, 2002. 17(5): pp. 669-676.

Rastegar, J., C. Pereira, and H.L. Nguyen. Piezoelectric-based power sources for harvesting energy from platforms with low frequency vibration. Smart Structures and Materials 2006: Industrial and Commercial Applications of Smart Structures Technologies, ed. E.V. White, Proceedings of SPIE vol. 6171, 2006.

Roundy, S. and Y. Zhang. Toward self-tuning adaptive vibration based micro-generators. Smart Structures, Devices, and Systems II, ed. Said F. Al-Sarawi, Proceedings of SPIE, vol. 5649, 2005. pp. 373-384.

Roundy, S., On the effectiveness of vibration-based energy harvesting. Journal of Intelligent Material Systems and Structures, 2005. 16(10): pp. 809-823.

Roundy, S., P.K. Wright, and J. Rabaey, A study of low level vibrations as a power source for wireless sensor nodes. Computer Communications, 2003. 26(11): pp. 1131-1144.

Shahruz, S.M., Design of mechanical band-pass filters with large frequency bands for energy scavenging. Mechatronics, 2006. 16(9): pp. 523-531.

Wang, Q.-M., et al., Electromechanical coupling and output efficiency of piezoelectric bending actuators. IEEE Transactions on Ultrasonics, Ferroelectrics, and Frequency Control, 1999. 46(3): pp. 638-646.

Wu, W.-J., et al. Smart wireless sensor network powered by random ambient vibrations. 2006 IEEE International Conference on Systems, Man, and Cybernetics, Taipei, Taiwan, pp. 2701-2708.

* cited by examiner

ENERGY CONVERTERS AND ASSOCIATED METHODS

CROSS-REFERENCE TO RELATED APPLICATIONS

This application is a continuation of U.S. application Ser. No. 12/362,125 filed Jan. 29, 2009, now U.S. Pat. No. 7,893,599, which claims the benefit of U.S. Provisional Application No. 61/024,496 filed Jan. 29, 2008, each of which is incorporated herein by reference in its entirety.

STATEMENT REGARDING FEDERALLY-SPONSORED RESEARCH

This work was supported by DOD/US Navy funding under subcontract to TPL Inc, grant number 212379.

BACKGROUND

Distributed sensing may be useful in the structural health monitoring of civil infrastructure, airframes, and process control systems. Distributed sensing typically utilizes wireless sensors and transmission networks. Providing power to the wireless sensors requires either long-term power sources, or devices that can harvest power from ambient or driven vibrations.

The three principal mechanisms of converting mechanical energy to electrical energy include electrostatic, electromagnetic, and piezoelectric conversions. For example, piezoelectric devices principally fabricated as cantilevers of ceramic (e.g., lead zirconate-titanate (PZT)) have been developed. In devices utilizing these mechanisms, however, extracting the maximum power from ambient vibration relies upon maintaining system vibration at a resonance frequency.

Two methods of controlling the resonant frequency of vibrating piezoelectric structures include:
1. Control the stiffness of a piezoelectric component by adaptive capacitive loading or other electrical control schemes; or
2. Clamp a beam at both ends and apply a destabilizing compressive load, which decreases the effective transverse stiffness of the beam as it approaches the buckling condition.

However, the foregoing techniques may not provide sufficient tunability for certain applications (e.g., the distributed sensing applications). Accordingly, energy converters with improved resonant frequency modulation are needed.

DETAILED DESCRIPTION

Figure 1A:
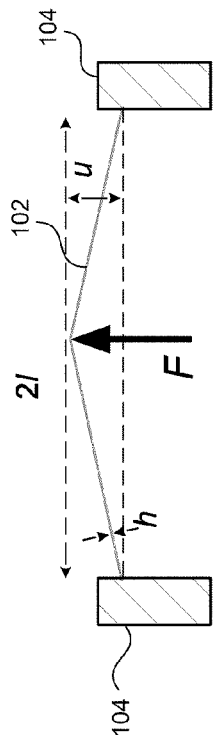
FIGS. 1A-D are schematic diagrams illustrating displacement of extensional elements between two fixed points in accordance with embodiments of the disclosure.

Specific details of several embodiments of the disclosure are described below with reference to energy converters that are frequency-tunable and associated methods for efficiently converting mechanical energy into at least one of electrical energy, optical energy, sound energy, and/or electromagnetic energy. The term "energy converter" generally refers to a device configured to convert at least a portion of one form of energy (e.g., mechanical energy) into a different form of energy (e.g., electrical energy). A person of ordinary skill in the art, therefore, will accordingly understand that the disclosure may have other embodiments with additional elements, or the invention may have other embodiments without several of the elements shown and described below.

Electrical energy can be harvested from vibrations in the ambient environment through the use of electromechanical transducers. To maximize the amount of mechanical power converted, it is generally believed that the resonant frequency of the energy converter should match that of the vibration frequency from the source; otherwise, the power that can be converted to electricity drops dramatically. Thus, to maximize the harvested power, the energy converter need to operate at a resonant frequency that at least approximately coincides with the vibration frequency of the source with the strongest vibration amplitude.

Many energy converters have been under development at academic and commercial research laboratories. However, only a few of them attempt to be tunable; that is, one that can change its resonant frequency to match the source although such an issue is generally recognized as a serious problem and one that limits the widespread application of this technique. As a result, custom non-tunable resonators would need to be manufactured for every different environment, and the manufacturing tolerances would need to be very close to realize the targeted resonant frequency.

Several embodiments of energy converters described herein have been demonstrated in a geometry that provides tunability that can easily vary the resonant frequency from ~30 Hz to ~235 Hz. In certain embodiments, the energy converters rigidly couple two energy conversion elements (e.g., piezoelectric polyvinylidene fluoride (PVDF) films) which individually would behave as non-linear springs, with a deflection member to form a generally linear spring structure that when oscillating operates in the stretching, rather than bending, regime. The tuning is shown to be repeatable by adjusting the initial position of the films relative to the deflection member. Power increases with the resonant frequency and acceleration input. It has been recognized that the geometry of several embodiments of the energy converter works to increase the linear operating range, providing greater power output from the same vibration input over conventional devices.

A. Generic Piezoelectric Vibration Harvester Model

Energy converters (e.g., piezoelectric actuators or resonators) can have two basic configurations, commonly known as the d33 and d31 modes. In d33 mode, piezoelectric resonators typically include a stack of piezoelectric components displaceable in an expansion in the same direction as both the electric field and the poling direction. The d33-mode piezoelectric resonators use the expansion of the active material to produce a displacement and thus, a linear motion. Typically, the active part of such piezoelectric resonators includes a stack of ceramic layers ranging in thickness between 20 to 100 micrometers (μm), separated by thin, uniformly sized and shaped metallic layers as electrodes.

D31 mode piezoelectric resonators act by contracting or expanding perpendicularly to the electric field and the poling direction. The d31 mode resonators use the change in shape of the active material, in the d31 mode, to produce a displacement. The active material of these piezoelectric resonators also can includes ceramic layers separated by thin metallic layers or polymeric films such as PVDF. However, these d31 mode piezoelectric resonators displace perpendicularly to the electric field and the poling direction, with the displacement being a function of the length of the resonators. The number of parallel layers and elastic modulus is believed to determine the stiffness of these piezoelectric resonators.

Without being bound by theory, it is believed that the generic vibration-converting transducer model can estimate the electrical power P for a vibration energy converter of natural angular frequency $\omega_N$ as follows when driven by a vibration of frequency $\omega$ and acceleration magnitude A:

$$|P| = \frac{m\zeta_E \left(\frac{\omega}{\omega_N}\right)^3 A^2}{\omega\left[\left(2(\zeta_E+\zeta_M)\frac{\omega}{\omega_N}\right)^2 + \left(1-\left(\frac{\omega}{\omega_N}\right)^2\right)^2\right]}, \quad (1)$$

where $\zeta$'s are dimensionless damping ratios with subscripts "E" and "M" denoting electrical and mechanical, respectively. The damping ratios are related to the viscous damping coefficients through $$\zeta = \frac{b}{2m\omega_N} = \frac{b}{2\sqrt{km}}, \quad (2)$$

where the substitution $$\omega_N = 2\pi f_N = \sqrt{\frac{k}{m}} \quad (3)$$

has been made. The total damping on the vibrating system is the sum of the mechanical and electrical damping, and is related to the quality factor Q by:

$$Q = \frac{1}{2(\zeta_M + \zeta_E)}. \quad (4)$$

The effective electrical damping is believed to be a function of the electromechanical coupling of the piezoelectric component, and the electrical load. The coupling coefficient of the piezoelectric material when deformed transversely to the electrodes, $k_{31}^2$, is related to elastic, electric and piezoelectric material constants through $$k_{31}^2 = \frac{d_{31}^2}{\varepsilon_{33}}E, \quad (5)$$

where $k_{31}^2$, is an upper bound to the transverse electromechanical coupling of a piezoelectric body, $k_{31,B}^2$, and is only reached when deformation of the piezoelectric body is uniform. By way of example, the bimorph is a two-layer laminate beam in which both layers are piezoelectric. $k_{31,B}^2$ of the bimorph in bending is believed to be related to $k_{21}^2$ through as follows:

$$k_{31,B}^2 = \frac{9}{16}\frac{k_{31}^2}{1-k_{31}^2/4}, \quad (6)$$

which will be close to $9/16 k_{31}^2$ for certain piezoelectric ceramics; for example, PZT 5A ceramic has $k_{31}^2=0.10$, and an ideal bimorph would have $k_{31,B}^2=0.123 \cdot (9/16)$. Often, a piezoelectric bimorph has the coupling reduced below that of Equation (6) by the inclusion of passive support shims. A reasonable estimate is that the coupling is about 75% of the pure-piezoelectric value. The electrical damping ratio may be related to the coupling coefficient of the body by the following equation:

$$\zeta_E = \frac{\omega k_{31,B}^2}{2\sqrt{\omega^2 + 1/(RC)^2}}, \quad (7)$$

where R is the resistance of the electrical load, and C is the piezoelectric clamped capacitance. Substitution of the capacitive impedance $\chi_C = 1/\omega C$ for the load resistance (the usual impedance matching condition) leads to (8)

$$\zeta_E = k_{31,B}^2/2\sqrt{2}. \quad (8)$$

The electrical load can be a resistor matched to the electrical impedance of the vibrating piezoelectric element to optimize the power output. Charge harvesting, such as non-linear processing of the input voltage, can also be used to increase recoverable power over that of simple impedance matching. The load drop over a resistor is a simple comparison that can allow for various device conditions to be evaluated. Therefore, the power delivered to a resistive load is useful to compare the relative efficacy of different vibration-scavenging mechanisms.

When the resonant frequency of a piezoelectric device is matched to the driving frequency, then Equation (1) becomes $$|P| = \frac{m\zeta_E A^2}{8\pi f_N (\zeta_E + \zeta_M)^2}. \quad (9a)$$

By Equation (9a), the natural frequency of the piezoelectric device may be matched to the largest $(A^2/f)$ in the vibration spectrum for maximum power generation. As a result, in several embodiments, for a fixed piezoelectric device volume and maximum live mass, the design variable may be the stiffness of the piezoelectric element.

B. The Extensional Mode Resonator

Many proposed piezoelectric vibration harvesting devices are cantilevered beams with a seismic mass at the free end. The cantilever is assumed to be a bending element—that is, the stresses in the piezoelectric cantilever are from bending, but the cantilever undergoes no significant length change from the non-deformed state. Mechanistically, this describes a situation in which there is a stress-free neutral plane located inside the beam. The bending stiffness of a cantilever constructed of an isotropic, homogeneous material loaded at the free end can be calculated as follows:

$$k_C = \frac{3EI}{l^3} \quad (9b)$$

where l is the bending moment of inertia, $I=bh^3/12$, such that b is the beam width and h is the thickness. The natural frequency of the cantilever is $$f_N = \frac{1}{\sqrt{m}} \frac{1}{2\pi} \sqrt{\frac{3EI}{l^3}}, \quad (10)$$

where m is the effective mass, which may be approximated as the seismic mass if it is much greater than the mass of the cantilever. In vibration-harvesting applications, this is typically the case.

Several embodiments of the present disclosure are related to energy converters that utilize at least primarily extension, rather than bending, of the piezoelectric elements. FIG. 1A schematically illustrates a string 102 of length 2l, as an example of an extensional energy conversion element, between two fixed end members 104. It is believed that such extensional energy conversion element (e.g., strings and membranes) cannot support bending moments, and so the contribution of bending may be ignored. The force F applied at the center to displace the center of the string 102 a distance u can be calculated as:

$$F = \frac{1}{4} \frac{Ebh}{l^3} u^3. \quad (11)$$

As can be seen from Equation (11), the string 102 exhibits a non-linear force deflection relationship, i.e., the force required for further deformation increases as the cube of deflection. In the case of a beam, either single or doubly clamped, the relationship between force and displacement is believed to be linear. It should be noted the cantilever has a linear range of about 25% of the beam length, while the doubly-clamped beam has a linear range of about 25% of the beam thickness.

A mass attached to the center of a string or membrane can harvest electrical power by driving the external frame via vibration. However, a non-linear spring-mass system is undesirable for at least two reasons. First, non-linear oscillating structures may exhibit dynamic behavior that is non-symmetrical as a function of an applied frequency, leading to complex behavior when the frequency changes. It is also believed that non-linear oscillating structures may also exhibit chaotic behavior, which would imply transformation of mechanical to electrical power over a time-varying band of frequencies.

Even though the non-linear force-deflection behavior suggests an opportunity for frequency tunability (e.g., it is believed that small deflections about a large mean deflection would be approximately linear, or the natural frequency may be changed by biasing the mean deflection), it is believed that there is no known way of conveniently implementing a constant mean center deflection while allowing free motion. For example, a biasing force may be applied to a sealed membrane by application of static pressure to one side of the string 102 which behaves as a spring element. However, such an application of static pressure would require adjustability in the field for robust tuning characteristics and hermeticity for long-term unattended operation. In another example, a mean force may be imposed on a string system by an attractive force on the center mass (such as gravity) or drag forces from a flowing fluid. Gravity biasing, however, would not allow tunability, and would further fix the orientation of the harvesting device. In a further example, viscous drag forces may be varied, but would introduce an unacceptable amount of mechanical loss.

Figure 1B:
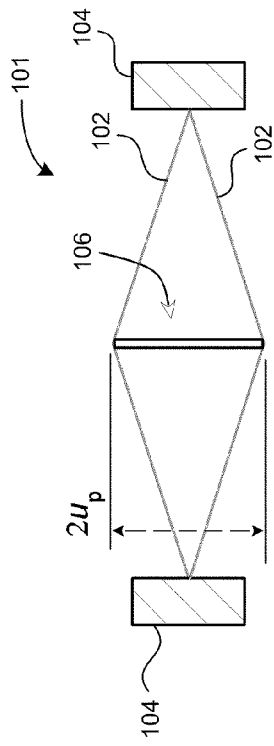

To at least partially address the foregoing issues, several embodiments of the disclosure provide the following approach to conveniently implement small and efficient energy converters and methods for harvesting vibration energy. FIG. 1B schematically illustrates an energy converter 101 having two extensional energy conversion elements (e.g., springs 102) described by Equation (11) coupled by a deflection member (e.g., a rigid link 106) that has a total length of $2u_p = u_1 + u_2$, in which $u_p$ is the "preloading" displacement. In the illustrated embodiment, the rigid link 106 is coupled at approximately the center of the springs 102. In other embodiments, the rigid link 106 can be coupled at other locations along the springs 102.

When the rigid link 106 is at equilibrium (i.e., a non-energized state), the forces exerted by each non-linear strings 102 sum to zero;

$$F_{TOT} = \frac{1}{4} \frac{E_1 b_1 h_1}{l_1^3} u_1^3 + \frac{1}{4} \frac{E_2 b_2 h_2}{l_2^3} u_2^3 = 0. \quad (12)$$

In certain embodiments, the two springs 102 can be generally identical, and so $u_1 = -u_2$ such that the initial deflection of each extensional element is $u_p$ at a non-energized state. For the remainder of this disclosure, the foregoing assumption is used for illustration purposes. In other embodiments, the two springs 102 may be different in structure, length, rigidity, and/or other characteristics.

Figure 1C:
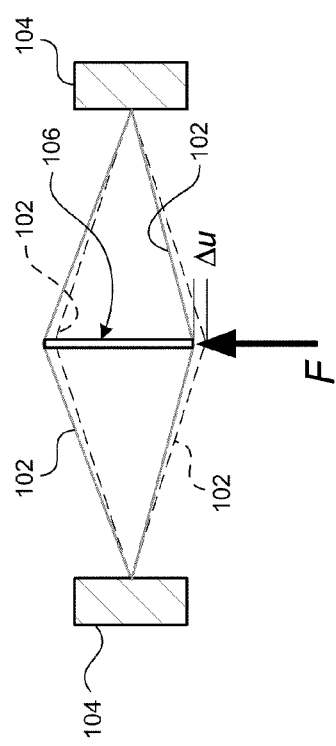

As shown in FIGS. 1B and 1C, the effective spring constant of the energy converter 101 is found by deflecting the rigid link by an arbitrary amount Δu, so that $$F_{TOT} = \frac{1}{4} \frac{Ebh}{l^3} (u_p + \Delta u)^3 + \frac{1}{4} \frac{Ebh}{l^3} (-u_p + \Delta u)^3, \quad (13)$$

$$= \frac{1}{4} \frac{Ebh}{l^3} (6u_p^2 \Delta u + 2\Delta u^3).$$

As can be seen from Equation (13), the force-deflection characteristics of the rigid link 106 include both linear and cubic terms in Δu. At sufficiently small deflections, the term proportional to $\Delta u^3$ may be neglected, and the stiffness becomes:

$$k = \frac{dF_{TOT}}{d(\Delta u)} \cong \frac{3}{2} \frac{Ebh}{l^3} u_p^2. \quad (14)$$

Figure 1D:
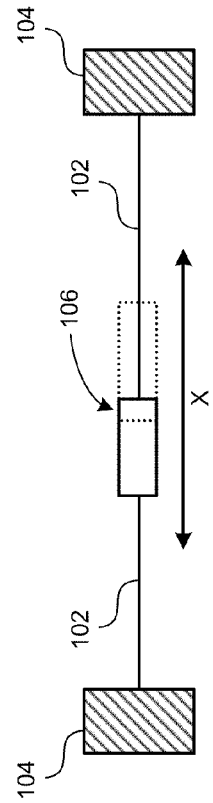

In another embodiment, as illustrated in FIG. 1D, the rigid link 106 can be positioned between two strings 102. The two fixed end members 104 may be displaced to pretension or stretch the two strings 102 relative to the rigid link 106. In operation, the rigid link 106 vibrates longitudinally along direction X relative to the two fixed end members 104. Without being bound by theory, it is believed that the linearity of the force-deflection characteristics of the rigid link 106 also follows the relations discussed above.

Figure 2:
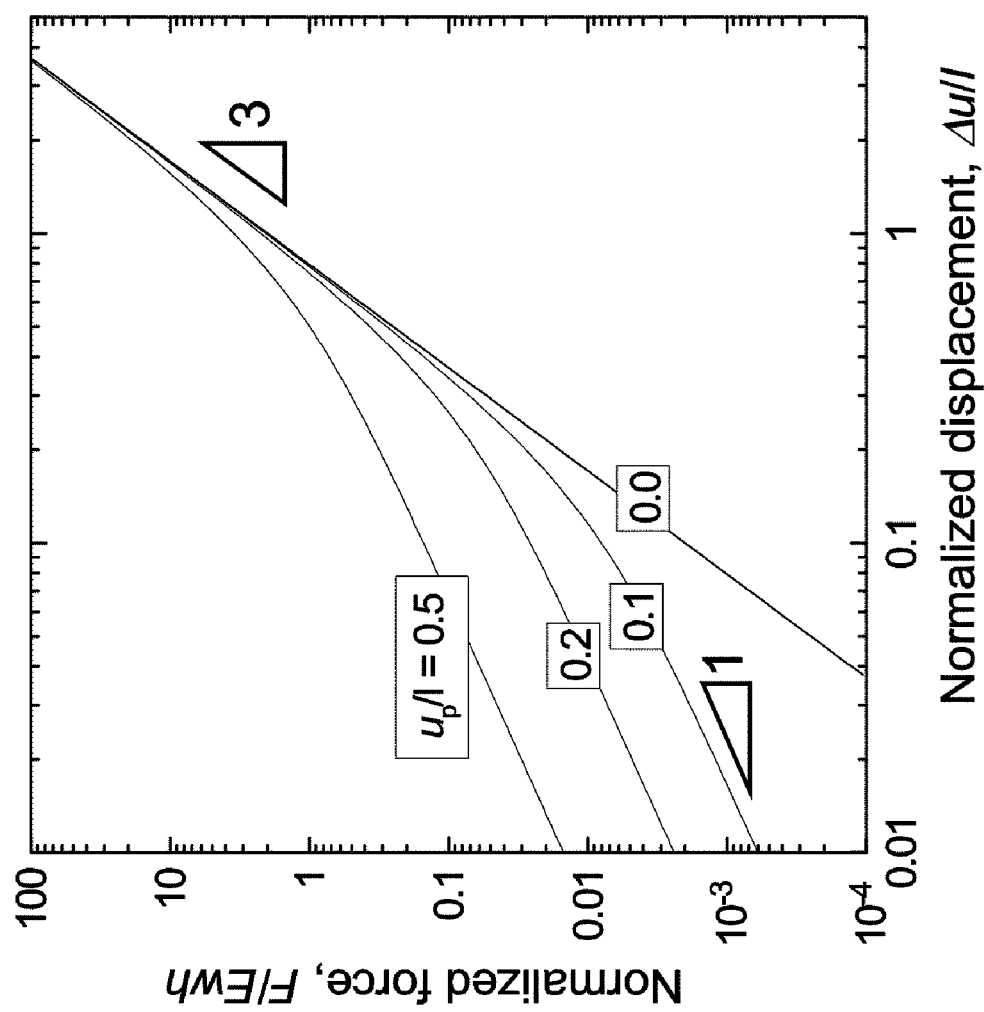
FIG. 2 is a plot of a normalized force versus displacement for various pretension settings in accordance with embodiments of the disclosure.

FIG. 2 illustrates normalized force-displacement relationships of Equation (13) with respect to increasing amounts of normalized preloading, $u_p/l$, in logarithmic coordinates. As long as the slope of the line in these coordinates is 1, then the spring behaves linearly. As shown in FIG. 2, the linear range of the energy converter 101 is approximately equal to the preloading displacement $u_p$.

Substitution of Equation (14) into Equation (10) shows that the natural frequency of the energy converter 101 is linearly related to the pre-deflection of the extensional elements, $$f_N = \frac{u_p}{\sqrt{m}} \frac{1}{2\pi} \sqrt{\frac{3}{2} \frac{Ebh}{l^3}}. \quad (15)$$

The linear $f_N(u_p)$ relationship is believed to be valid for other transversely-loaded extensional energy conversion elements, and substitution of the appropriate force-deflection relationship. Regardless of the dimensions of the extensional energy conversion elements, Equation (15) at least partially encapsulates the resonant frequency (expected to be close to the natural frequency) tunability of the energy converters described in the next section. For any other shape elements, e.g. a circular diaphragm loaded at the center, the development of Equations (12)-(15) proceeds with the substitution of $$F = \beta u^3 \quad (16)$$

where β is the proportionality between the force and cube of displacement for the other geometries.

Energy Converters

Several embodiments of a energy converter includes a resonating mass-spring device that converts at least some of the mechanical energy imparted to it from an external vibrating energy source to electrical energy. Embodiments of such a device can be particularly useful for low-power sensing and information transmission applications. In certain embodiments, the energy converter can have two piezoelectric elements, each of which are non-linear, but can be combined to form an overall linear structure. By changing the initial tension on the piezoelectric elements, the effective spring constant may be changed such that the resonant frequency can be varied over a wide range.

In a particular embodiment, a piezoelectric energy converter with a repeatable frequency adjustment range greater than 120 Hz has been demonstrated. Because the maximum power occurs approximately at the resonant frequency, and frequencies vary depending on the environment, a large adjustment range is desirable for a practical vibration energy converter. The energy converters described herein are configured to extend the linear force-deflection region that increases with applied tension to the film, in contrast to a single element membrane that exhibits a cubic force-displacement relationship. This provides the ability to harvest a uniform level of power over a broad range of accelerations and frequencies.

In addition, it is believed that tension increases the resonant frequency of the structure. The assumption of constant mechanical damping cannot be made in this case as the tension applied in the film at different tension settings changes the stress state of the film. Simple power measurements over a fixed load resistance demonstrated the extension of the linear regime with applied tension, and power is also shown to roll off at a point that appears to coincide with the transition from the linear to the cubic region of the force-deflection relation. The tuning was shown to be repeatable by adjusting the initial position of the extensional energy conversion elements relative to the deflection member. Power increases with the resonant frequency and acceleration input, and a plateau in harvestable power occurs with the transition from a linear to a cubic force-displacement relationship. The geometry of the coupled resonator structure works to increase the linear operating range providing greater power output from the same vibration input.

The unique performance of the energy converter described herein is based on the following characteristics:
  Has a resonant frequency that can be tuned based on the length of the deflection member;
  Does not suffer from a drop in power output at higher resonant frequencies;
  The tunability is passive, and once set does not require additional power to adjust once set.

The unique performance is believed to be based on the geometry and design of the structure, which couples two non-linear springs to form a linear spring system which extends the linear regime of the device's deflection-force relationship beyond that can be achieved in either a bending geometry or a single membrane that has a cubic force-deflection relationship.

In one embodiment, the energy converter is used to power sensor nodes and transmission systems. In another embodiment, the energy converter has a resonant frequency that can be tuned. Other embodiments include the integration of the energy converter with other electronic devices.

Figure 3A:
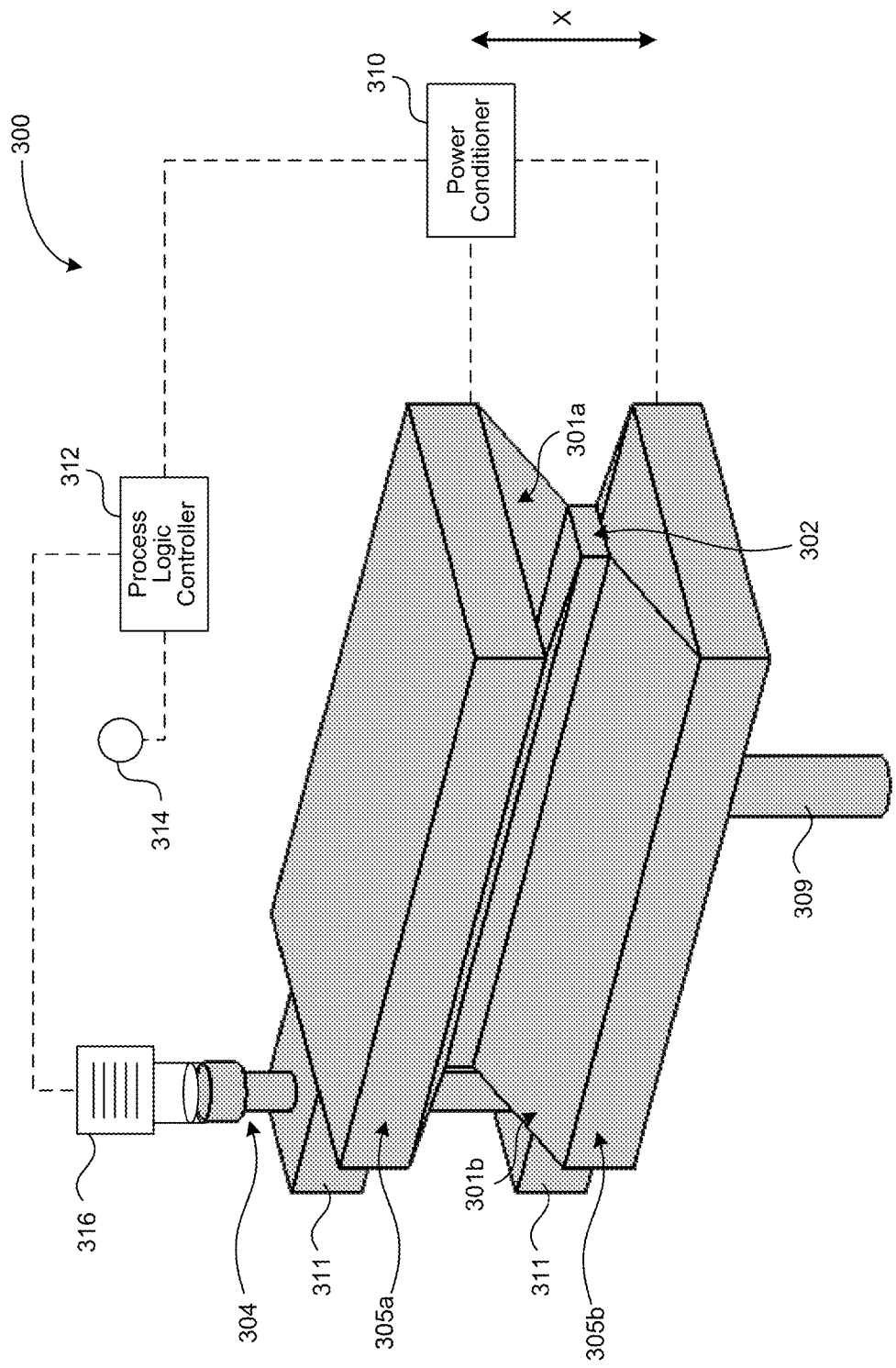
FIG. 3A is a schematic diagram of a frequency-tunable resonator in accordance with embodiments of the disclosure.

Several embodiments of energy converters referred to as extensional mode resonator ("XMR") are schematically illustrated in FIGS. 3A-4B. FIG. 3A is a schematic diagram of an XMR 300 having rectangular shaped piezoelectric elements in accordance with embodiments of the disclosure. As shown in FIG. 3A, the XMR 300 can include energy conversion elements (e.g., piezoelectric elements 301, identified individuals as first piezoelectric element 301*a* and second piezoelectric element 301*b*) respectively where the ends are secured or fixed to an upper seismic mass 305*a* and a lower seismic mass 305*b* (collectively referred to as seismic masses 305). The other ends of the piezoelectric elements 301*a* and 301*b* are fixed to a central structural member 302, which is fixedly attached to a support 309 via, e.g., an aperture (not shown) in the second seismic mass 305*b* and the second piezoelectric element 301*b*. The seismic masses 305 also individually include a flange 311 through which a deflection adjustment member 304 is positioned.

In the illustrated embodiment, the piezoelectric elements 301 include two generally identical rectangular films. In other embodiments, the piezoelectric elements 301 can include circular diaphragms as described in more detail below with reference to FIGS. 4A and 4B. In further embodiments, the piezoelectric elements 301 can also include strings, wires, coils, flexural elements, a combination of these structures, and/or other suitable structures.

The piezoelectric elements 301 can be constructed from any material capable of generating an electrical potential in response to mechanical stress. Suitable materials include gallium orthophosphate, langasite, barium titanate, lead titanate, lead zirconate titanate, potassium niobate, lithium niobate, lithium tantalite, sodium tungstate, Ba2NaNb5O5, Pb2KNb5O15, Polyvinylidene fluoride (PVDF), Sodium potassium niobate, Bismuth ferrite, and/or other suitable piezoelectric materials. The piezoelectric elements 301 may include monolithic piezoelectric elements, thin film or composite structures, and/or woven composite materials.

Figure 3B:
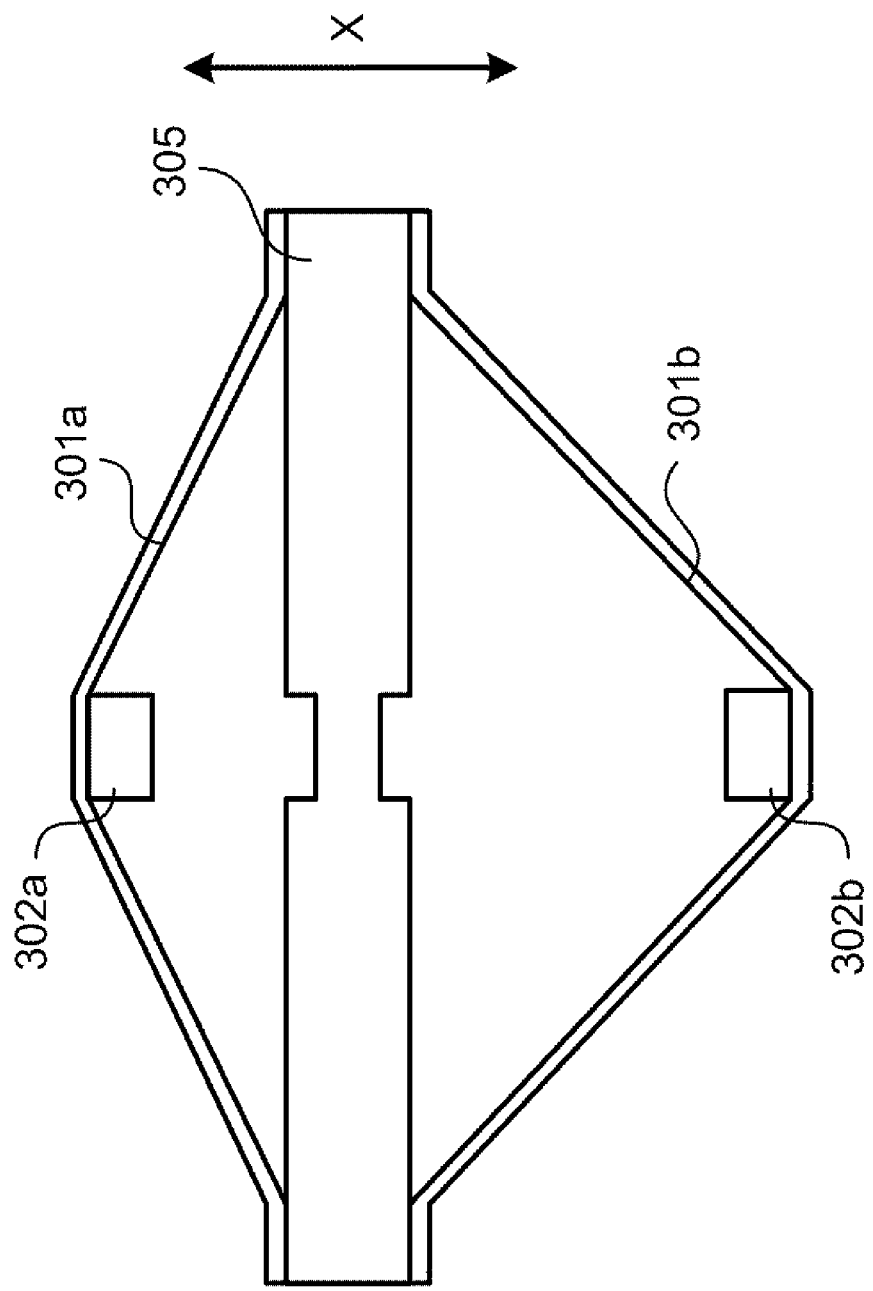
FIG. 3B is a schematic diagram of a frequency-tunable resonator in accordance with other embodiments of the disclosure.

The piezoelectric elements 301 may undergo generally uniform tension in the rest position. Such tension may be referred to hereinafter as "preloading," "static deflection," or "static tension." Without being bound by theory, it is believed that the geometry of the XMR 300 can produce stretching of the piezoelectric elements instead of flexure or bending. For example, in the illustrated embodiment, the seismic masses 305 are positioned relative to each other by use of the deflection adjustment member 304. As a result, the piezoelectric elements 301 are stretched or pretensioned relative to the central structural member 302 and the seismic masses 305. In other embodiments, the piezoelectric elements may be pretensioned by stretching over the first and second structural members 302a and 302b, as illustrated in FIG. 3B. Accordingly, the seismic mass 305 can vibrate in the X direction between the first and second structural members 302a and 302b.

In the illustrated embodiment of FIG. 3A, the seismic masses 305 are suspended relative to the central structural member 302 by the piezoelectric elements 301. The seismic masses 305 can oscillate together relative to the central structural member 302 in response to environmental vibrations in the direction X at a frequency and amplitude that correlate to those of the environmental vibrations. The seismic masses 305 may include a plate, a slab, a cylinder, and/or other suitable structures that are substantially rigid. In other embodiments, the seismic masses 305 may be contained within a cage-like structure (not shown) in which a plurality of piezoelectric elements 301 suspend the seismic masses 305 within the cage-like structure. The cage-like structure may be cubic, rectangular, triangular, circular or any other shape. The seismic masses 305 can include a structure constructed from a metal, a metal alloy, ceramics, and/or other material with sufficient rigidity.

In operation, the seismic masses 305 sense the environmental vibration and vibrate accordingly relative to the central structural member 302. The vibration of the seismic masses 305 alternatively applies mechanical stress on the piezoelectric elements 301a and 301b in the X direction. For example, when the seismic masses 305 move up, the first piezoelectric element 301a is relaxed while the second piezoelectric element 301b is stretched. when the seismic masses 305 move down, the first piezoelectric element 301a is stretched while the second piezoelectric element 301b is relaxed. The piezoelectric elements 301 then convert the applied mechanical stress into electrical energy and output an electrical signal to a power conditioner 310.

Without being bound by theory, it is believed that for a certain size of the piezoelectric elements 301, the physical distances between the structural member 302 and the seismic masses 305 defines the preloading and therefore the resonant frequency of the piezoelectric elements 301. In certain embodiments, the preloading can be fixed to define a current versus frequency response of the XMR 300. In applications where the environmental vibration frequency is generally a constant, the XMR 300 can be tuned to at least increase the electrical response from the environmental vibration. Such embodiments provide for an economy of scale in manufacture by enabling a single extensional mode resonator configuration for a range of applications. For example, the XMR 300 can be tuned to the environmental vibration frequency with the highest amplitude for a particular environment. Such tuning may occur at the time of XMR installation or prior to device installation if the environmental frequency is known.

In other embodiments, the preloading can be adjusted dynamically in response to fluctuations in the environmental vibration frequency spectrum either periodically or continuously. For example, the adjustment member 304 can be used to modulate a physical distance between the seismic masses 305, and thus the distances between each of the seismic masses 305 and the central structural member 302. Therefore, the tension on the piezoelectric elements 301 may be adjusted. In the illustrated embodiment, the adjustment member 304 includes a screw configured to modulate the distance between the seismic masses 305. In other embodiments, the adjustment member 304 can also include hydraulic pistons, pneumatic drives, and/or other suitable components.

Optionally, the XMR 300 can also include electronic circuitry (e.g., a feedback controller) and/or electrical/mechanical components (e.g., amplitude monitors, power output monitors, actuators, etc.) configured to modulate the preloading and/or to monitor a feedback of the electrical response as a function of preloading. For example, in the illustrated embodiment, the XMR 300 includes the power conditioner 310 (e.g., rectifiers, charge pumps, etc.) electrically coupled to the piezoelectric elements 301, a process logic controller 312 coupled to a seismic monitor 314 for monitoring environmental vibration, and an actuator 316 (e.g., an electric motor) operatively coupled to the adjustment member 304.

In certain embodiments, the controller 312 receives a signal of environmental vibration from the seismic monitor 314 (e.g., frequencies, amplitude, etc.). The controller 312 then determines a desired natural frequency for the XMR 300 by, for example, identifying the frequency of the environment vibration with the largest amplitude. The controller 312 can then calculate a degree of deflection for the piezoelectric elements 301 based on the desired natural frequency. The controller 312 then modulates the actuator 316 to drive the adjustment member 304 for adjusting a position of the seismic masses 305 relative to the structural member 302 until the calculated degree of deflection is achieved. In other embodiments, the controller 312 can also monitor a power output from the piezoelectric elements 301 via the power conditioner 310 and modulate the actuator 316 to drive the adjustment member 304 such that the power output from the piezoelectric elements 301 may be at least increased or maximized. In further embodiments, the degree of deflection may be adjusted based on both the signal from the seismic monitor 314 and the power output of the piezoelectric elements 301.

Figure 4A:
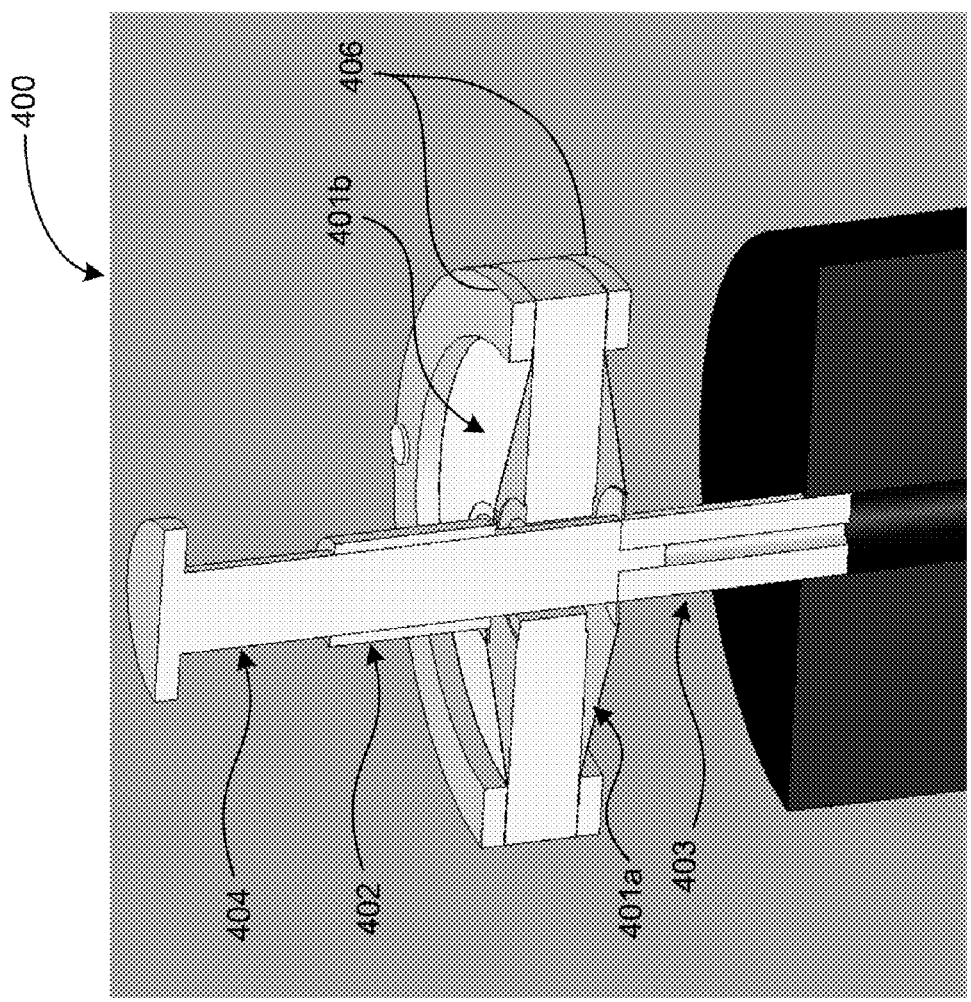
FIG. 4A is a partially sectional schematic diagram of a frequency-tunable resonator in accordance with further embodiments of the disclosure.
Figure 4B:
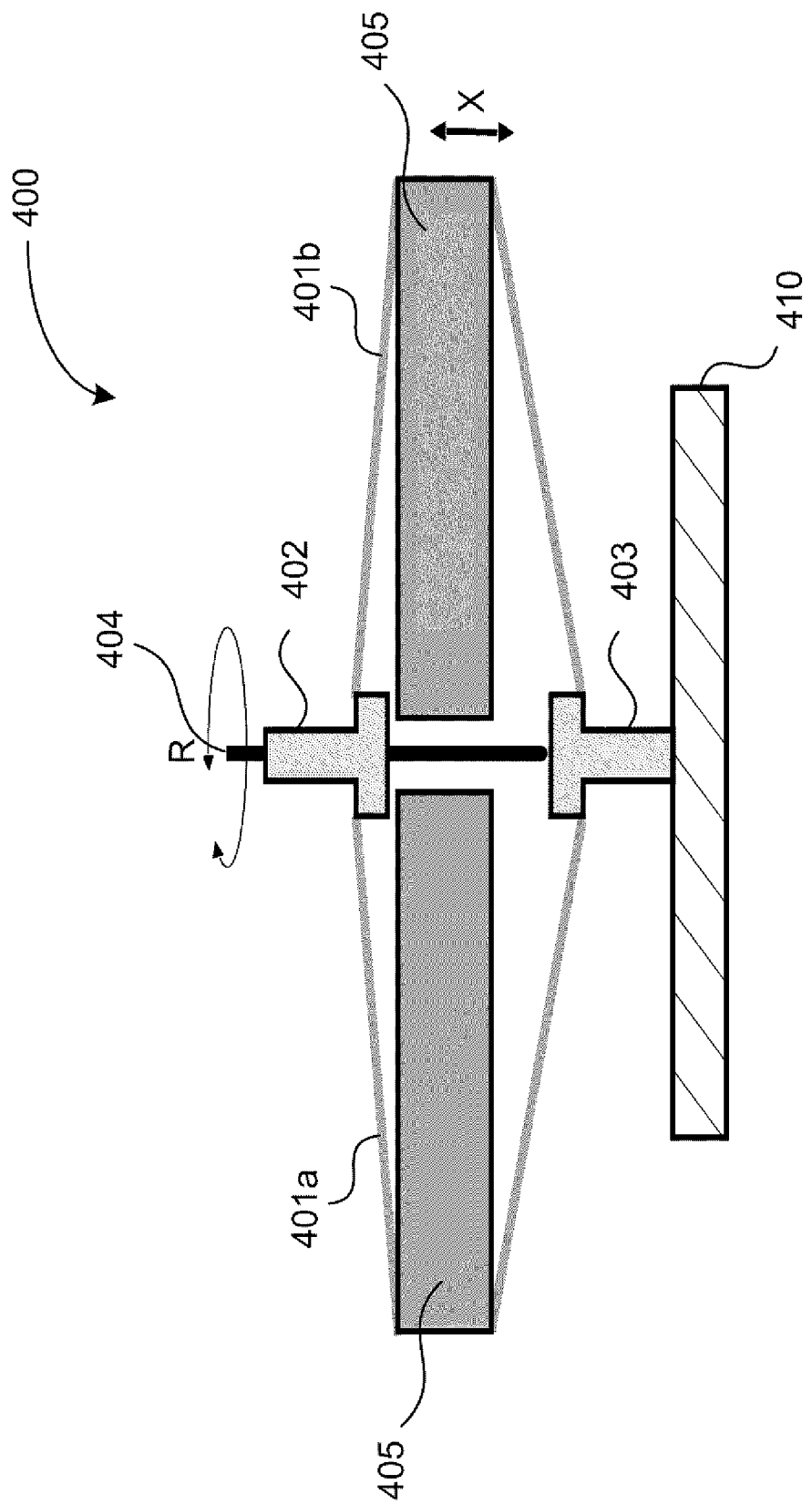
FIG. 4B is a schematic diagram of the frequency-tunable resonator in FIG. 4A in accordance with embodiments of the disclosure.

FIG. 4A is a partially sectional schematic diagram of an XMR 400 having generally circular-shaped piezoelectric elements in accordance with further embodiments of the disclosure. FIG. 4B is a schematic diagram of the XMR 400 in FIG. 4A. Even though only certain components are shown in FIGS. 4A and 4B, embodiments of the XMR 400 can also include electronic circuitry and/or electrical/mechanical components (e.g., those described above with respect to FIG. 3) and/or other suitable electrical and/or mechanical components.

Referring to FIGS. 4A and 4B together, the XMR 400 can include a first piezoelectric element 401a and a second piezoelectric element 401b extending between a first end member 402 and a second end member 403 that is attached to a base 410. The XMR 400 can also include a deflection member or seismic mass 405 tensionally suspended between the first piezoelectric element 401a and the second piezoelectric element 401b to apply a deflection, pretension, or preloading thereto. A pair of rings or flanges 406 fasten the first and second piezoelectric elements 401a and 401b and the seismic mass 405 together. The XMR 400 can also include an adjustment member 404 (shown as a screw for illustration purposes) configured to adjust a distance between the first and second end members 402 and 403 for modulating a pretension on the first and second piezoelectric elements 401a and 401b from the seismic mass 405. In the illustrated embodiment, the first and second piezoelectric elements 401a and 401b are generally symmetrical relative to the seismic mass 405. In other embodiments, the first and second piezoelectric elements 401a and 401b may be asymmetrical relative to the seismic mass 405.

In operation, the seismic mass 405 senses environmental vibration and vibrate accordingly in the direction X relative to the first and second end members 402 and 403. The vibration of the seismic mass 405 applies mechanical stress on the piezoelectric elements 401a and 401b. The piezoelectric elements 401a and 401b convert the applied mechanical stress into electrical energy that can be used for powering remote sensors, electronic monitors, and/or other suitable devices.

Even though several embodiments of the energy converters are described above with reference to FIGS. 3-4B as having two piezoelectric elements, in certain embodiments, the energy converters may include only one piezoelectric element pretensioned by a deflection member against a generally non-movable structure. In further embodiments, the energy converter may include three, four, or any other desired number of piezoelectric elements with adjacent ones separated by a deflection member.

EXAMPLES

A device was created in the spirit of the rigidly-linked string or membrane mechanism shown schematically in FIG. 1C with piezoelectric elements that stretch or extend. As convenient shorthand to distinguish the vibration-harvesting mechanism in this work from a bending-beam+mass mechanism, we refer to the energy converter as an extensional Mode Resonator (XMR).

The first embodiment of the XMR used a full circular diaphragm geometry generally similar to that described above with reference to FIG. 4A. The circular diaphragms were made from metalized 28 μm-thick piezoelectric polyvinylidene fluoride (PVDF) (Measurement Specialties, Inc), and a seismic mass largely constructed from an alloy of 90% tungsten, 6% copper, and 4% nickel. This tungsten alloy has a density of 17 g/cm$^3$, close to the density of pure tungsten (19.3 g/cm$^3$) but is easy to machine with conventional tooling. The total live mass is 26.4 grams. Other rigid parts of the XMR are constructed of brass. The PVDF was glued to the clamping rings and attached to both sides of the seismic mass with nylon screws. The W-alloy and brass components were electrically isolated from the metalized PVDF film by applying a lacquer coating where they might contact the PVDF, and etching the electrodes from the PVDF using a peroxy-sulfuric acid solution. The piezoelectric properties of the PVDF, as reported by the manufacturer, are $d_{31}$=23 pC N$^{-1}$, $\epsilon$=106-113 pF m$^{-1}$, and E=2-4 GPa.

The PVDF elements are suspended at the center with flanged spools. The rigid link between the spools is an axial tuning screw, the effective length of which may be changed by turning the screw relative to the spool. This is the mechanism by which $u_p$, and therefore the resonant frequency, is controlled. The volume of the XMR (excluding testing fixtures) is about 10 cm$^3$ (0.6 in$^3$).

Experimental Procedure

The XMR was mounted solidly to a vibration table (Brüel and Kjaer 4801 system) for testing. The driving signal was typically white noise (to observe a frequency spectrum) or a sine wave from the signal source on a dynamic signal analyzer (DSA) (Agilent 35670A). The open-circuit voltage from the XMR and an accelerometer that was also mounted to the vibration table were input to the DSA. The data was collected using either an oscilloscope (Tektronix TDS 2002) or the DSA. A convenient method of characterizing the spectrum of dynamic behavior is the frequency response function (FRF), defined as the open circuit output of the device divided by the acceleration measured from the vibration table. In the linear approximation, the FRF will not depend on the amplitude of driving vibrations.

Resonant Frequency Tunability

Figure 5:
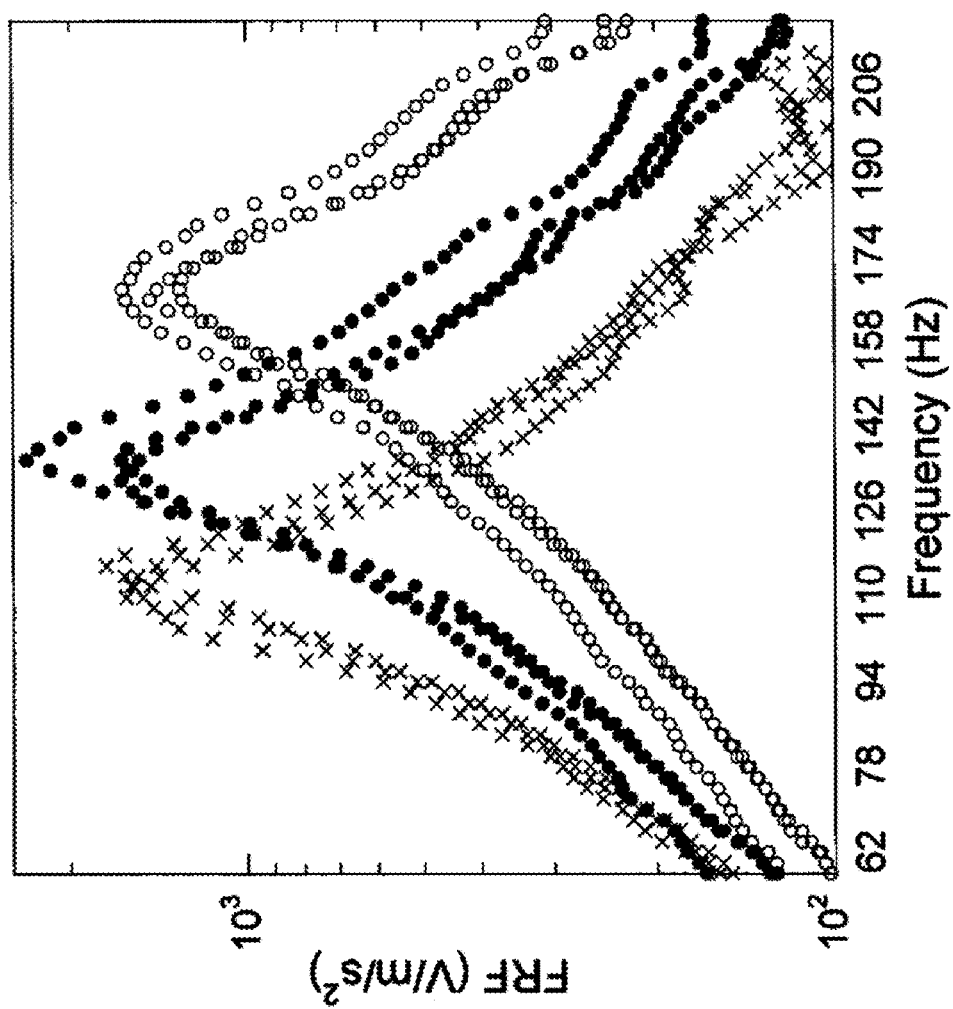
FIG. 5 is a plot of frequency response function versus frequency in accordance with embodiments of the disclosure.

A concern of any frequency tunable device is the ability to provide repeatability of resonance adjustability. FIG. 5 is a plot of several frequency response functions ("FRF's") as a function of frequency. Each FRF was found after changing the pretension displacement. The XMR was tuned between three screw positions, shown in the table below.

| Position | Average Frequency Hz | Standard Deviation |
|---|---|---|
| 1 | 112.67 | 3.06 |
| 2 | 134.67 | 2.31 |
| 3 | 167.33 | 1.15 |

Position 2 was the initial point. Position 1 had an $u_p$ of 0.1 mm less (¼ turn of the adjustment screw) than Position 2 and Position 3 had an $u_p$ of 0.2 mm greater (½ turn of the adjustment screw) than Position 2. In general, when the screw setting was aligned to a mark at a particular position, the resonant frequency was repeatable.

Figure 6:
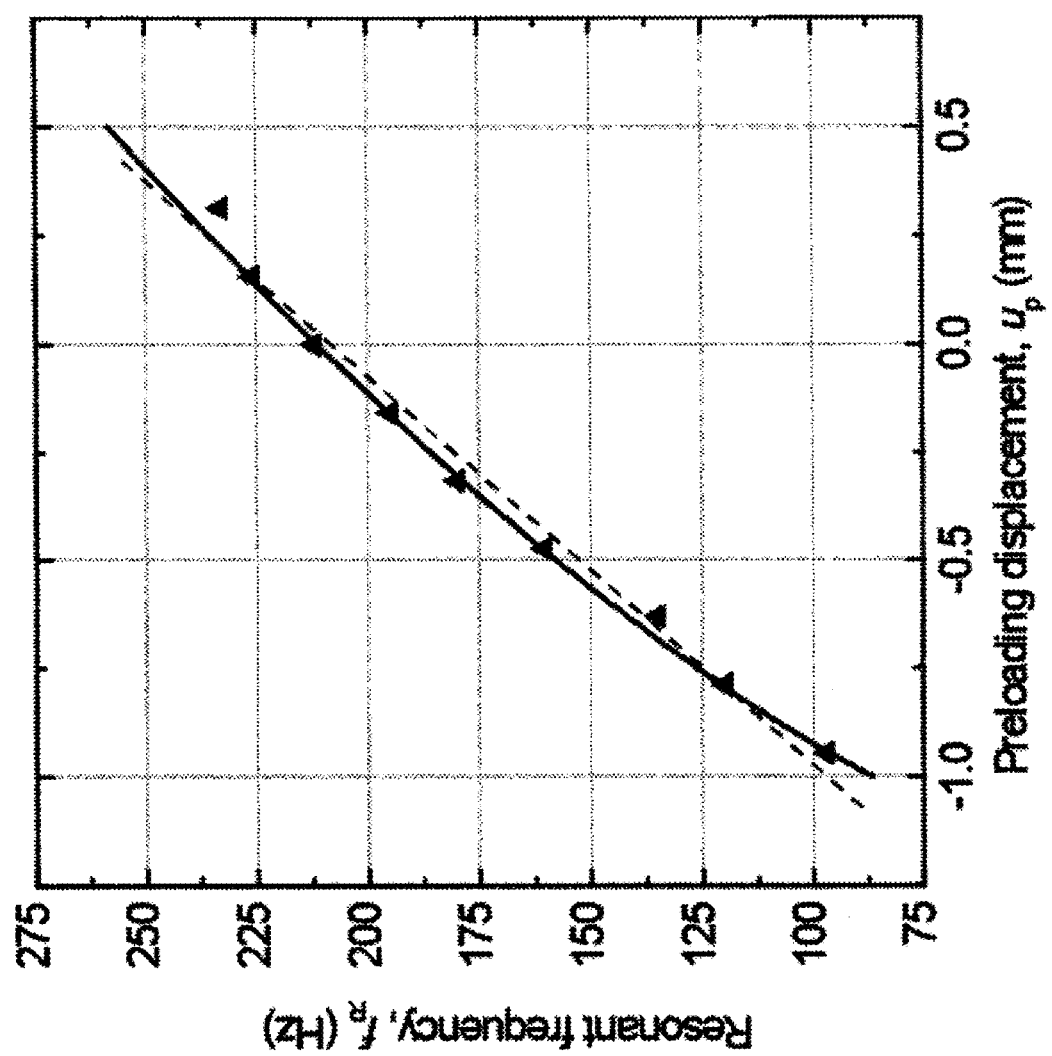
FIG. 6 is a plot of resonant frequency versus preloading displacement in accordance with embodiments of the disclosure.

FIG. 6 is a plot of the resonant frequency as a function of the displacement of the tuning screw (relative to $f_R$=212 Hz). The resonant frequency may be related to the natural frequency by $$\omega_R = \omega_N(1-2\zeta^2) \tag{17}$$

If the damping is entirely mechanical in nature, then substitution of Equations (2), (15) and (16) into (17) yields a simple relationship between resonant frequency and preloading displacement, $$f_R = \frac{1}{2\pi} \frac{1}{\sqrt{m}} \sqrt{6\beta u_p^2 - \frac{b_M^2}{2m}}. \tag{18}$$

Therefore, the relationship between resonant frequency and preloading displacement is not quite linear, with the non-linearity modulated by the mechanical resistance. For this device, it is likely that the mechanical resistance, does not change with natural frequency. If so, then Equation (18) should be a reasonable descriptor of $f_R$ ($u_p$).

The data in FIG. 6 was fit by Levenberg-Marquardt least-squares minimization to Equation (18), shown as a solid black line. It is seen that Equation (18) describes the data well, particularly in comparison to a linear approximation (shown as a thin dashed line), which would be approximation of the resonant frequency as the natural frequency. Outputs from the best fit to Equation (18) are $b_M$=51.5±5.0 N·sm$^{-1}$, $\beta$=819±120 MPa mm$^{-1}$, and the unmeasured bias to the pre-loading displacement, $u_{p,0}$=4.4±0.6 mm.

The resonant frequency, for this particular geometry, ranges between 97 Hz and 235 Hz. A tuning range, defined as the difference between the highest and lowest frequency divided by the lowest frequency, of 144% was achieved with the XMR technique for the data shown in FIG. 6, which is not the maximum range possible but merely that used for the existing demonstration purposes. Larger ranges are certainly possible. The upper resonant frequency limit of the XMR will be determined by mechanical failure (either fracture or permanent plastic deformation) of the extensional piezoelectric elements.

Electrical Output and Power Generation

As shown above, the XMR as a unit behaves as a linear mass-spring system over a large range of displacements. However, each PVDF element is still non-linear, and will generate an increasing amount of electrical harmonics of the fundamental driving frequency. Electrical power that is in harmonic frequencies may be difficult for charge-recovery electronics to recover, and could be lost.

Figure 7:
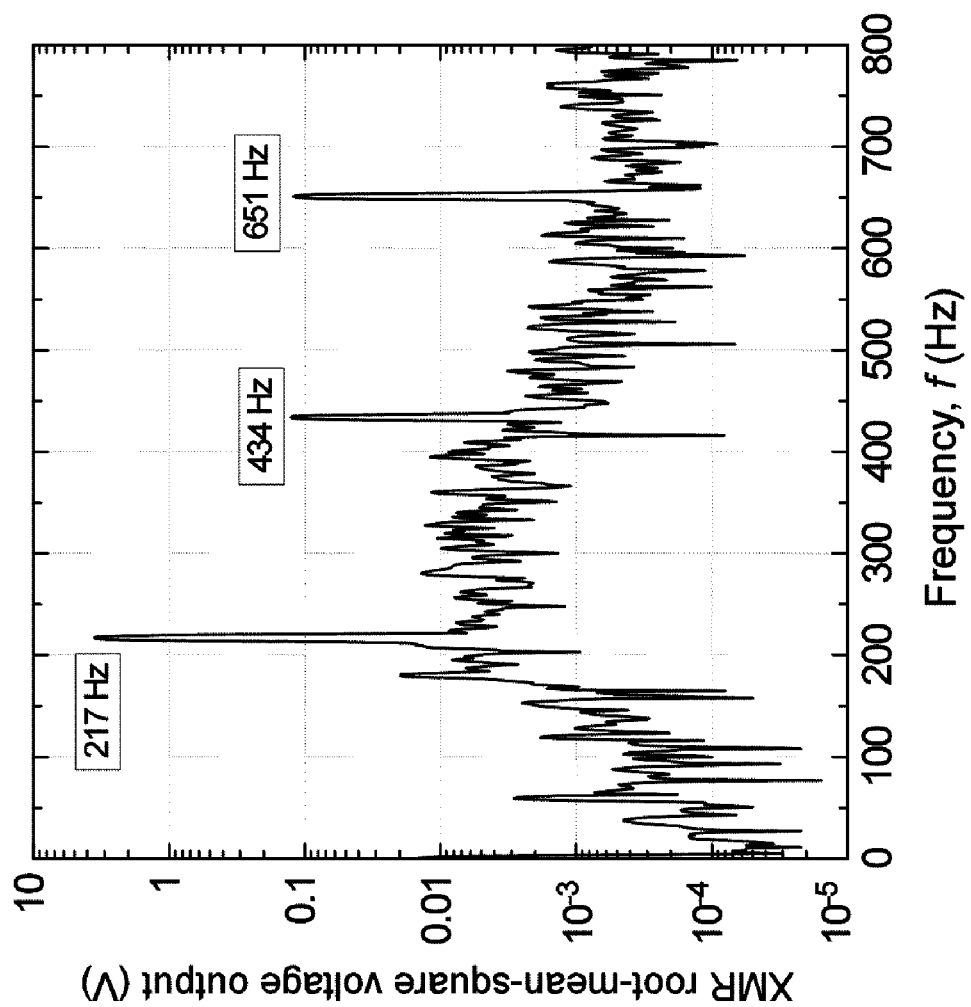
FIG. 7 is a plot of output voltage versus frequency in accordance with embodiments of the disclosure.

A simple experiment was performed to get an estimate of the magnitude of the power contained within the harmonics, known as total harmonic distortion (THD). After finding the resonant frequency of a particular setting on the XMR, the vibration table was driven near the resonant frequency, in this case 217 Hz. The acceleration signal confirmed that this was the only frequency contained in the vibration spectrum. FIG. 7 is a plot of the voltage output from the XMR while driven at 10 m/s$^2$ RMS; the main peak is, of course, at 217 Hz. Higher harmonics appear at 434 and 651 Hz. The total power contained within these two harmonics is only 0.13% of that within the main peak. At a vibration driving amplitude of 5 m/s$^2$ RMS, the THD is halved to 0.058%. As of now, harmonic generation is not a significant source of power loss.

Figure 8:
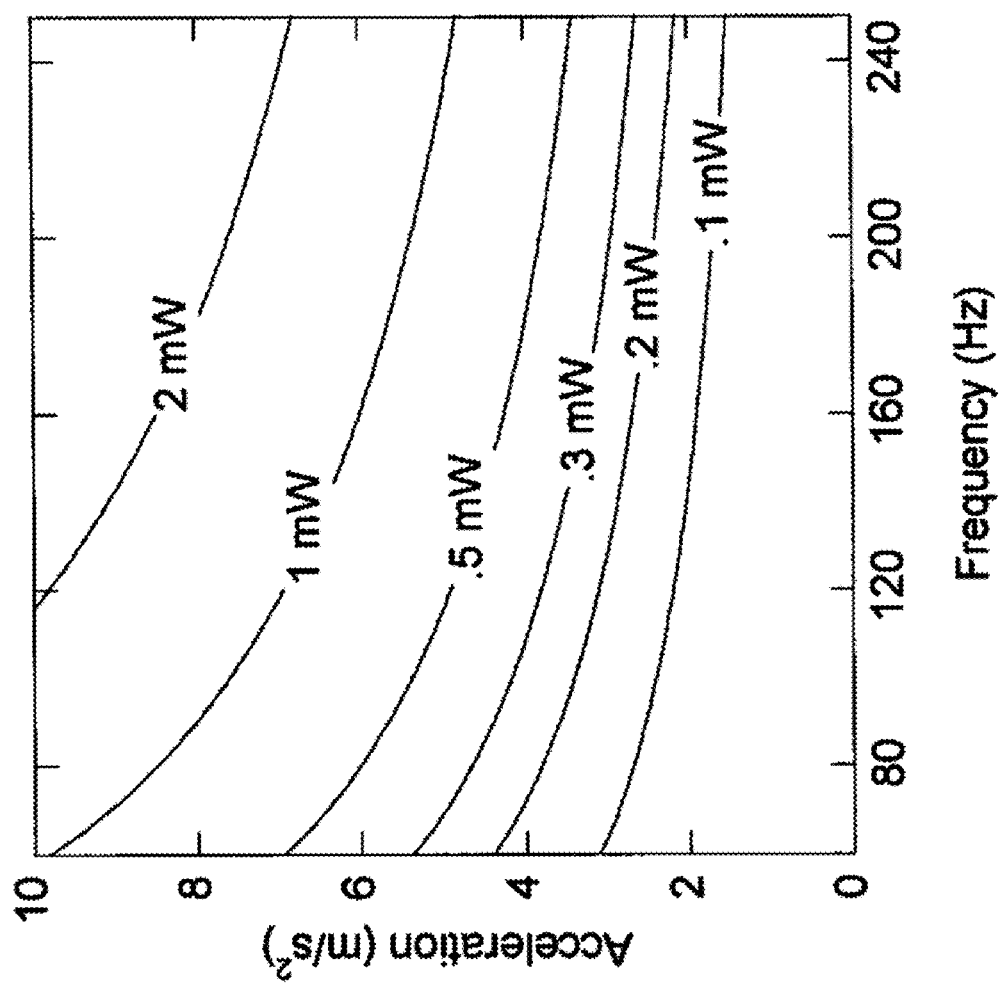
FIG. 8 is a plot of power produced at various combinations of acceleration and frequency in accordance with embodiments of the disclosure.

With experimental measurements of the tuning range of the XMR, and achieved open-circuit outputs of 1.75 volts from one PVDF element of 3 nF capacitance, estimates can be made of the recoverable electric power. The mechanical response assumes constant mechanical damping instead of constant dimensionless damping, $\xi_M$. Furthermore, the electrical damping is assumed to be small compared to the mechanical damping. The consequence of this is that the (acceleration normalized) voltage amplitude from the XMR will stay constant with varying resonant frequency (a consequence of a linear, damped oscillator), but the power will increase as frequency increases. The harvestable power is estimated as ¼ of the "exchange power" through the capacitor in open circuit conditions; that is, $$P = \frac{1}{4} \overline{V}_{OC}^2 (2\pi f_R) C A^2 \quad (19)$$

where $\overline{V}_{OC}$ indicates the open-circuit voltage per m/s$^2$, C is the capacitance, and A is the RMS acceleration, or about 0.7 times the acceleration amplitude. This expression assumes, and is a consequence of, that power is dissipated over a resistor which has a resistance equal to the capacitive impedance of the XMR. FIG. 8 maps the result of Equation (19) onto a plot of acceleration vs. resonant frequency. At 1 g RMS acceleration and 180 Hz with both membranes being used to generate power, the XMR (as currently designed) should be capable of producing 0.5 mW of recoverable power. Greater power could be achieved by increasing the seismic mass, improving the piezoelectric material, reducing mechanical losses and parasitic capacitance.

Figure 9:
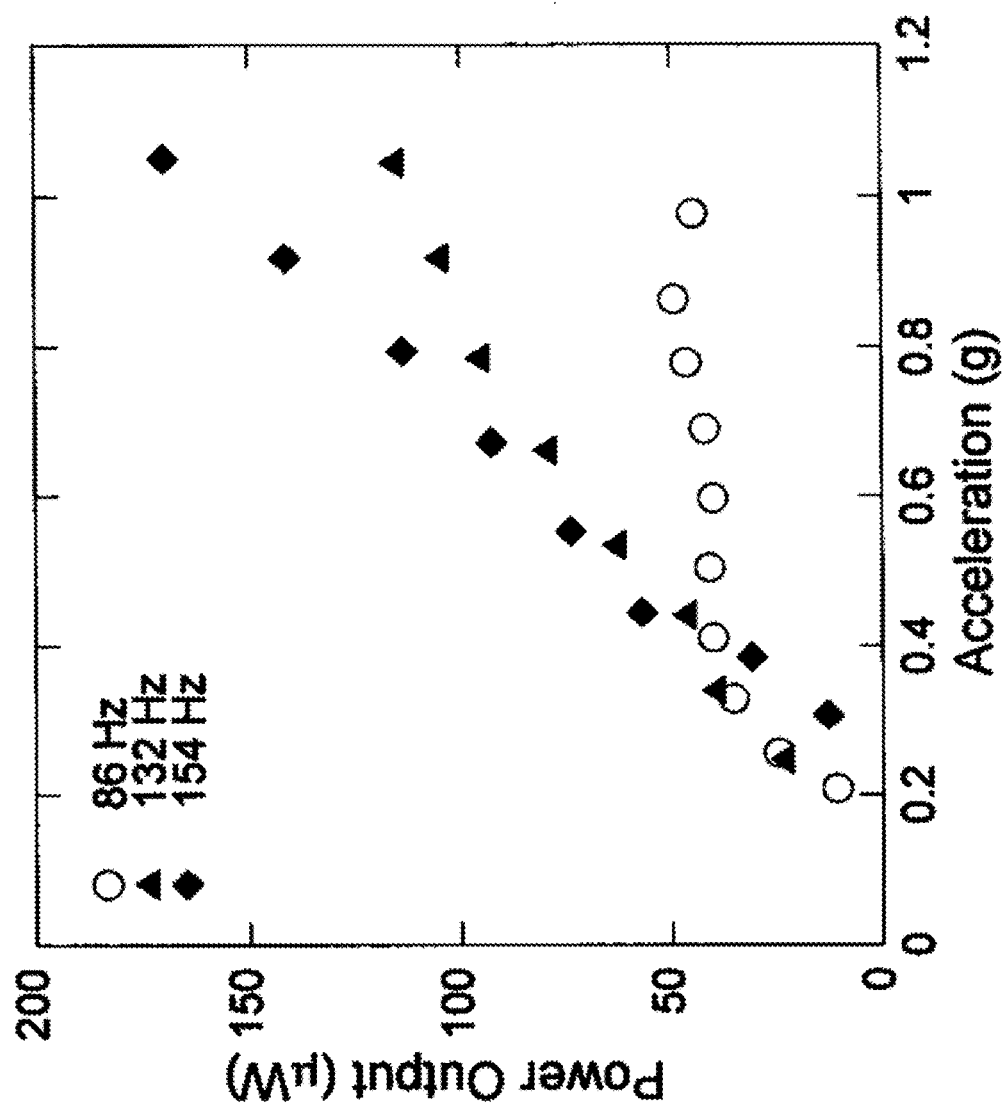
FIG. 9 is a plot of power output versus acceleration for three different resonant frequencies in accordance with embodiments of the disclosure.

The theoretical model in FIG. 8 used a mass of 35.6 g and a capacitance of 3 nF. FIG. 9 shows the power output from a version of the XMR with a live mass of 26.4 g (a reduction of ~25%) and a capacitance of 1.1 nF (~63% reduction) and one working piezoelectric element. Accounting for the reduction due to these changes, experimental values agree with the theoretical plot. Most importantly, the transition from the linear response to the cubic response is shown to increase with increased pretension and resonant frequency. Since power is directly related to the strain, and hence deflection, in a piezoelectric film while the acceleration is directly related to the applied force on the system, the behavior is FIG. 9 is as was suggested in FIG. 2; the pretension increases the linear regime in output and operating in the stretching, rather than bending, regime provides significant tunability while maintaining the power output at higher frequencies.

Mechanical Losses

It is believed that the gain in mechanical response at resonance (the quality factor, Q) has a great effect on the total conversion of mechanical to electrical energy. One of the tradeoffs of high Q are that the power output drops off significantly as the driving vibration frequency deviates from the resonant frequency of the harvester. However, if frequency tunability is incorporated into device design this tradeoff is largely overcome, and high Q is again desirable.

Assuming, from open-circuit conditions that all frictional forces are mechanical in origin, Q may be estimated from the bandwidth $\Delta f$ at half of peak power (or at 70.7% of peak voltage):

$$Q = f_R / \Delta f \quad (20)$$

Q can also be defined in terms of mass, spring stiffness and the mechanical resistance R which is related to the damping force, $F_D$, through $F_D = R\dot{u}$ as $$Q = \frac{\sqrt{mk}}{R}. \quad (21)$$

If our system is able to vary resonant frequency through variations of k only, then $$Q = 2\pi \frac{m}{R} f_R. \quad (22)$$

Therefore, Q should increase linearly with the resonant frequency. It has been observed empirically that dimensionless mechanical damping, $\xi_M$, decreased with increasing resonant frequency. Substitution of the constant-mass resonant frequency into the expression for $\xi_M$ shows that $\xi_M$ should decrease reciprocally with $f_R$ with no change in the mechanical resistance:

$$\xi_M = \frac{R}{2\sqrt{km}} = \frac{R}{4\pi m} \frac{1}{f_R}. \quad (23)$$

From the foregoing, it will be appreciated that specific embodiments of the invention have been described herein for purposes of illustration, but that various modifications may be made without deviating from the invention. Elements of one embodiment may be combined with other embodiments in addition to or in lieu of the elements of the other embodiments. Accordingly, the invention is not limited except as by the appended claims.

We claim:

1. A device for converting between mechanical vibration energy having a vibration frequency and electrical energy, comprising:
   a first structural member;
   a second structural member spaced apart from the first structural member;
   a first piezoelectric element and a second piezoelectric element individually extending between the first structural member and the second structural member; and
   a deflection member between the first and second piezoelectric elements, wherein the deflection member extends, rather than bends, the first and second piezoelectric elements in a rest position such that the first and second piezoelectric elements are under a uniform pretension from the deflection member and the first and second structural members, the pretension having a value that sets a target resonance frequency of the device to at least approximately coincide with the vibration frequency of the mechanical vibration energy.

2. The device of claim 1 wherein the first and second piezoelectric elements are generally identical to each other, wherein the first and second piezoelectric elements have a rectilinear shape or a conical shape, and wherein the tension of the first and second piezoelectric elements are adjustable based on the target resonance frequency.

3. The device of claim 1 wherein the first and second piezoelectric elements are at least partially flexible such that the deflection member deflects the first and second piezoelectric elements away from each other, and wherein the tension of the first and second piezoelectric elements are dynamically adjustable.

4. The device of claim 1 wherein the first and second piezoelectric elements are at least partially flexible such that the deflection member deflects the first piezoelectric element in a first direction, and wherein the deflection member deflects the second piezoelectric element in a second direction generally opposite of the first direction.

5. The device of claim 1 wherein the device has a natural frequency linearly related to a degree of deflection of the first or second piezoelectric element.

6. The device of claim 1 wherein a distance between the first and second piezoelectric elements is adjustable.

7. An energy converter, comprising:
   a first end member and a second end member spaced apart from the first end member;
   a first conversion element coupled to the first end member;
   a second conversion element coupled to the second end member, at least one of the first and second conversion elements is at least partially deformable and is configured to convert mechanical energy to electrical energy; and
   a mass between the first and second conversion elements, at least one of the first end member, the second end member, and the mass applying a uniform static pretension in a rest position to extend, rather than bend, at least one of the first and second conversion elements, and wherein the pretension has a value that sets a target resonance frequency of the energy converter to at least approximately coincide with a vibration frequency of a mechanical vibration energy.

8. The energy converter of claim 7 wherein the first and second conversion elements extend between the first and second end members in the longitudinal direction, and wherein the mass is located generally in a center position along the longitudinal direction.

9. The energy converter of claim 7 wherein the first and second conversion elements extend between the first and second end members in the longitudinal direction, and wherein the mass stretches at least one of the first and second conversion elements in a transverse direction.

10. The energy converter of claim 7 wherein the first and second conversion elements extend between the first and second end members in the longitudinal direction, and wherein at least one of the mass and the first and second end members stretch at least one of the first and second conversion in the longitudinal direction.

11. The energy converter of claim 7 wherein the first and second conversion elements extend between the first and second end members in a longitudinal direction, and wherein the mass is located generally in a center position along the longitudinal direction, and further wherein the mass stretches at least one of the first and second conversion in a transverse direction.

12. The energy converter of claim 7 wherein the first and second conversion elements individually include a generally circular diaphragm that is at least partially deformable.

13. A method for energy conversion, comprising:
    receiving a vibration from an environment with an energy converter, the energy converter including a substantially rigid mass that pretensions a piezoelectric element by extending rather than bending the piezoelectric element to a degree of pretension on the piezoelectric element that sets a target resonance frequency for the energy converter to at least approximately coincide with a frequency of the vibration from the environment; and
    converting the received vibration from the environment into electric energy with the energy converter having the target resonance frequency.

14. The method of claim 13 wherein the target resonance frequency of the energy converter corresponds to a frequency of the vibration from the environment.

15. The method of claim 13, further comprising:
    detecting a frequency of the vibration from the environment; and
    wherein the degree of pretension on the piezoelectric element causes the energy converter to have a resonance frequency that generally matches the detected frequency of the vibration from the environment.

16. An energy converter, comprising:
    a first structural member and a second structural member spaced apart from the first structural member;
    a piezoelectric element coupled to the first and second structural members with pretension, the piezoelectric element and the first and second structural members at least partially define a resonance frequency of the energy converter; and
    means for adjusting a degree of the pretension to set a target resonance frequency for the energy converter to at least approximately coincide with a frequency of a mechanical vibration from which energy is to be harvested, wherein the means for adjusting the degree of pretension extends rather than bends the piezoelectric element.

17. The energy converter of claim 16 wherein means for adjusting a degree of the pretension include means for adjusting a degree of the pretension based on a target resonance frequency for the energy converter during a non-energized state.

18. The energy converter of claim 16 wherein means for adjusting a degree of the pretension include means for dynamically adjusting a degree of the pretension based on a target resonance frequency for the energy converter.

19. The device of claim 1 wherein:
the first piezoelectric element has a first planar portion and the second piezoelectric element has a second planar portion; and
the deflection member applies a force through a plane of at least one of the first and second planar portions.

20. The device of claim 19 wherein the first and second piezoelectric elements have a rectilinear shape.

21. The energy converter of claim 7, wherein:
the first conversion element has a first planar portion and the second conversion element has a second planar portion; and
the mass applies a force through a plane of at least one of the first and second planar portions.

22. The energy converter of claim 21, wherein the first and second energy conversion elements have a conical shape.

* * * * *

UNITED STATES PATENT AND TRADEMARK OFFICE
CERTIFICATE OF CORRECTION

| | |
|---|---|
| PATENT NO. | : 8,358,049 B2 |
| APPLICATION NO. | : 13/030667 |
| DATED | : January 22, 2013 |
| INVENTOR(S) | : Dylan J. Morris et al. |

It is certified that error appears in the above-identified patent and that said Letters Patent is hereby corrected as shown below:

In the Specification

Column 1, lines 17 and 18, under STATEMENT REGARDING FEDERALLY-SPONSORED RESEARCH that reads "This work was supported by DOD/US Navy funding under subcontract to TPL Inc, grant number 212379." should be changed to --This invention was made with Government support under N68335-08-C-0098 awarded by the Department of the Navy. The Government has certain rights in this invention.--

Signed and Sealed this
Seventeenth Day of March, 2015

Michelle K. Lee
*Director of the United States Patent and Trademark Office*